DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 5, 1975

937 O.G. 13

T937,006

CHLORINATED BUTADIENE/ALKYL ACRYLATE GRAFTED COPOLYMERS

Okan Max Ekiner, 2315 Empire Drive Kingsridge, Wilmington, Del. 19810

Filed June 24, 1974, Ser. No. 482,789
Int. Cl. S03f *15/00, 191/00*
U.S. Cl. 260—876 R
No Drawing. 10 Pages Specification

Polymeric blends of (a) a graft copolymer of (1) a chlorinated butadiene selected from chloroprene and 2,3-dichlorobutadene-1,3, (2), a $C_1$–$C_8$ alkyl acrylate or a $C_1$–$C_8$ alkyl ester of an unbranched $\alpha$-($C_1$–$C_4$)alkylacrylic acid, and (3) up to 2% by weight of sulfur; and (b) a copolymer of sulfur and a chlorinated butadiene selected from chloroprene and 2,3-dichlorobutadiene1,3;

the above monomer (a)(2) being copolymerized in part with monomers (a)(1) and (a)(3) and grafted in part onto the resulting copolymer;

the proportion by weight of the above component (a)(2) being 40–80% in (a) and 15–60% in the total composition;

the proportion of sulfur in (b) being 0.2–2.0%; and the number average molecular weight between sulfur atoms in (b) being not over 110,000 can be isolated as a continuous, breakage-resistant film from the blend of the latices of (a) and (b) by freezing the latex blend on a roll, provided there is present in the blend 0.3–8.0 parts by weight of methanol, ethanol, isopropyl alcohol, or ethylene glycol for each 100 parts by weight of the latex blend. The isolated polymeric blend is readily peptizable in aliphatic liquids to form sprayable dispersions useful as adhesives.